United States Patent
Swope et al.

(10) Patent No.: US 9,755,294 B2
(45) Date of Patent: Sep. 5, 2017

(54) ACCURATELY ESTIMATING TRUE BEARINGS OF RADIO FREQUENCY IDENTIFICATION (RFID) TAGS ASSOCIATED WITH ITEMS LOCATED IN A CONTROLLED AREA

(71) Applicant: SYMBOL TECHNOLOGIES, LLC, Lincolnshire, IL (US)

(72) Inventors: Charles B Swope, Coral Springs, FL (US); Benjamin J Bekritsky, Modin (IL); Antonio Faraone, Fort Lauderdale, FL (US)

(73) Assignee: Symbol Technologies, LLC, Holtsville, NY (US)

( * ) Notice: Subject to any disclaimer, the term of this patent is extended or adjusted under 35 U.S.C. 154(b) by 552 days.

(21) Appl. No.: 14/324,283

(22) Filed: Jul. 7, 2014

(65) Prior Publication Data
US 2016/0003930 A1 Jan. 7, 2016

(51) Int. Cl.
- H01Q 3/00 (2006.01)
- H01Q 1/22 (2006.01)
- G06K 7/10 (2006.01)
- H01Q 3/26 (2006.01)
- H01Q 25/00 (2006.01)

(52) U.S. Cl.
CPC ....... H01Q 1/2216 (2013.01); G06K 7/10475 (2013.01); H01Q 3/2605 (2013.01); H01Q 25/00 (2013.01)

(58) Field of Classification Search
CPC .... H01Q 1/2216; H01Q 3/2605; H01Q 25/00; G06K 7/10475

USPC .......................................................... 342/368
See application file for complete search history.

(56) References Cited

U.S. PATENT DOCUMENTS

| | | | |
|---|---|---|---|
| 4,353,073 A | 10/1982 | Brunner et al. |
| 5,066,956 A | 11/1991 | Martin |
| 5,173,703 A | 12/1992 | Mangiapane et al. |
| 5,181,040 A | 1/1993 | Inoue et al. |
| 5,859,610 A | 1/1999 | Lenormand et al. |
| 7,079,035 B2 | 7/2006 | Bock et al. |
| 7,250,902 B2 | 7/2007 | Manoogian et al. |

(Continued)

FOREIGN PATENT DOCUMENTS

| | | |
|---|---|---|
| CA | 2615245 A1 | 6/2008 |
| WO | 92/00531 A1 | 1/1992 |

(Continued)

OTHER PUBLICATIONS

Spong, "An Efficient Method for Computing Azimuth and Elevation Angle Estimates from Monopulse Ratio Measurements of a Phased Array Pencil Beam Radar with Two-Dimensional Angle Steering", Radar Conference, 1999, The Record of the 1999 IEEE, Apr. 20, 1999-22.

(Continued)

*Primary Examiner* — Frank J McGue (57) ABSTRACT

An RFID tag reading system and method estimate true bearings of RFID tags associated with items in a controlled area. A plurality of secondary receive beams are rotated in a cycle about a boresight axis of a primary receive beam to generate a plurality of secondary receive signals. A controller processes all the secondary receive signals received in the cycle to estimate a true bearing for each tag in the controlled area.

17 Claims, 9 Drawing Sheets

(56) References Cited

U.S. PATENT DOCUMENTS

| | | |
|---|---|---|
| 7,310,045 B2 | 12/2007 | Inui |
| 7,602,293 B2 | 10/2009 | Taki et al. |
| 7,777,609 B2 | 8/2010 | Kuramoto |
| 7,928,894 B1 | 4/2011 | Fox |
| 8,115,594 B2 | 2/2012 | Koezuka et al. |
| 8,248,306 B2 | 8/2012 | Legay et al. |
| 8,305,265 B2 | 11/2012 | Ezal et al. |
| 8,390,458 B2 | 3/2013 | Nonaka et al. |
| 8,427,370 B2 | 4/2013 | Pozgay |
| 8,461,965 B2 | 6/2013 | Chen et al. |
| 8,482,387 B2 | 7/2013 | Iwahashi |
| 8,493,182 B2 | 7/2013 | Hofer et al. |
| 8,558,731 B1 | 10/2013 | Woodell |
| 8,577,308 B2 | 11/2013 | Choi et al. |
| 8,587,495 B2 | 11/2013 | Faraone et al. |
| 8,952,844 B1 | 2/2015 | Wasiewicz |
| 9,059,754 B2 | 6/2015 | Zhang et al. |
| 9,111,190 B2 | 8/2015 | Jacques et al. |
| 9,177,180 B2 | 11/2015 | Sano |
| 9,361,494 B2 | 6/2016 | Swope et al. |
| 2005/0110641 A1 | 5/2005 | Mendolia et al. |
| 2005/0113138 A1 | 5/2005 | Mendolia et al. |
| 2005/0280508 A1 | 12/2005 | Mravca et al. |
| 2006/0181393 A1 | 8/2006 | Raphaeli |
| 2007/0060802 A1 | 3/2007 | Ghevondian et al. |
| 2007/0080787 A1 | 4/2007 | Taki et al. |
| 2007/0273530 A1 | 11/2007 | Koezuka et al. |
| 2008/0157934 A1 | 7/2008 | Posamentier |
| 2008/0157970 A1 | 7/2008 | Single et al. |
| 2008/0180221 A1 | 7/2008 | Tuttle |
| 2008/0224828 A1 | 9/2008 | Ando et al. |
| 2008/0297324 A1 | 12/2008 | Tuttle |
| 2009/0002165 A1 | 1/2009 | Tuttle |
| 2009/0073041 A1 | 3/2009 | Ferreol et al. |
| 2009/0147625 A1 | 6/2009 | Pillai et al. |
| 2009/0240120 A1 | 9/2009 | Mensinger et al. |
| 2010/0039228 A1 | 2/2010 | Sadr et al. |
| 2010/0123617 A1 | 5/2010 | Yu et al. |
| 2010/0151810 A1 | 6/2010 | Grau Besoli et al. |
| 2010/0188211 A1 | 7/2010 | Brommer et al. |
| 2010/0207738 A1 | 8/2010 | Bloy |
| 2010/0225480 A1 | 9/2010 | Bloy et al. |
| 2010/0231410 A1 | 9/2010 | Seisenberger et al. |
| 2010/0237995 A1 | 9/2010 | Iwahashi |
| 2011/0006885 A1 | 1/2011 | Park et al. |
| 2011/0018691 A1 | 1/2011 | Park et al. |
| 2011/0050421 A1 | 3/2011 | Duron et al. |
| 2011/0063095 A1 | 3/2011 | Tomiyama et al. |
| 2011/0133891 A1 | 6/2011 | Krug et al. |
| 2011/0169613 A1 | 7/2011 | Chen et al. |
| 2011/0270045 A1 | 11/2011 | Lebel et al. |
| 2012/0075073 A1* | 3/2012 | Fislage ............ G06K 7/10435 340/10.1 |
| 2012/0139810 A1 | 6/2012 | Faraone et al. |
| 2012/0189078 A1 | 7/2012 | Eom et al. |
| 2012/0248187 A1* | 10/2012 | Piazza ............ H01Q 3/00 235/439 |
| 2012/0262358 A1 | 10/2012 | Wallner |
| 2012/0314791 A1 | 12/2012 | Zhang et al. |
| 2013/0021141 A1 | 1/2013 | Brommer et al. |
| 2013/0099898 A1 | 4/2013 | Bloy |
| 2013/0106671 A1 | 5/2013 | Eom et al. |
| 2013/0113669 A1* | 5/2013 | Bellows ............ H01Q 1/2216 343/764 |
| 2013/0127620 A1 | 5/2013 | Siebers et al. |
| 2013/0201003 A1 | 8/2013 | Sabesan et al. |
| 2014/0104125 A1 | 4/2014 | Choiniere et al. |
| 2014/0197928 A1 | 7/2014 | Jacques et al. |
| 2014/0201423 A1 | 7/2014 | Jean et al. |
| 2014/0266894 A1 | 9/2014 | Rasheed et al. |
| 2014/0361078 A1 | 12/2014 | Davidson |
| 2015/0123869 A1 | 5/2015 | Bit-Babik et al. |
| 2015/0169910 A1 | 6/2015 | Koch et al. |
| 2015/0278565 A1 | 10/2015 | Bekritsky et al. |
| 2015/0323662 A1 | 11/2015 | Swope et al. |
| 2016/0001803 A1 | 1/2016 | Kim et al. |
| 2016/0103198 A1 | 4/2016 | Swope et al. |
| 2016/0152350 A1 | 6/2016 | Puentes et al. |
| 2017/0109555 A1 | 4/2017 | Koch et al. |

FOREIGN PATENT DOCUMENTS

| | | |
|---|---|---|
| WO | 2008/082434 A2 | 7/2008 |
| WO | 2009/151778 A2 | 12/2009 |
| WO | 2011/135328 A2 | 11/2011 |
| WO | 2014/113363 A1 | 7/2014 |

OTHER PUBLICATIONS

Hajime Sakamoto and Peyton Z. Peebles, Jr., "Conopulse Radar" IEEE Transactions on Aerspace and Electronic Systems, vol. AES-14, No. 1, Jan. 1978.

International Search Report and Written Opinion for International Patent Application No. PCT/US2014/011411 dated Apr. 4, 2014.

International Search Report and Written Opinion for International Patent Application No. PCT/US2014/069112 dated Mar. 6, 2015.

International Search Report and Written Opinion for International Patent Application No. PCT/US2015/021486 dated Jun. 22, 2015.

International Search Report and Written Opinion for International Patent Application No. PCT/US2015/029423 dated Aug. 5, 2015.

Toby Haynes, "A Primer on Digital Beamforming", Spectrum Signal Processing, 15 pages (Mar. 26, 1998).

EPC Radio-Frequency Identity Protocols Class-1 Generation-2 UHF RFID Protocol for Communications at 860MHz-960 MHZ; Version 1.2.0; GS1 EPC Global Specification for RFID Air Interface; 108 pages (Oct. 23, 2008).

Patil et al., "An Emerging Anti Collision Protocol in RFID", 2010 National Conference on Advances in Recent Trends in Communication and Networks, 3 pages (Jan. 15-16, 2010).

* cited by examiner

ACCURATELY ESTIMATING TRUE BEARINGS OF RADIO FREQUENCY IDENTIFICATION (RFID) TAGS ASSOCIATED WITH ITEMS LOCATED IN A CONTROLLED AREA

BACKGROUND OF THE INVENTION

The present disclosure relates generally to a system for, and a method of, accurately estimating true bearings of radio frequency (RF) identification (RFID) tags associated with items located in a controlled area, with high resolution, especially under real-world, multi-path reflection, conditions.

Radio frequency (RF) identification (RFID) technology is becoming increasingly important for logistics concerns, material handling and inventory management in retail stores, warehouses, distribution centers, buildings, and like controlled areas. An RFID system typically includes an RFID reader, also known as an RFID interrogator, and preferably a plurality of such readers distributed about the controlled area. Each RFID reader interrogates at least one RFID tag, and preferably many more RFID tags, in its coverage range. Each RFID tag is usually attached to, or associated with, an individual item, or to a package for the item, or to a pallet or container for multiple items. Each RFID tag typically includes an antenna, a power management section, a radio section, and frequently a logic section containing a control microprocessor, a memory, or both. Each RFID reader transmits an RF interrogating signal, and each RFID tag, which senses the interrogating RF signal, responds by transmitting a return RF response signal. The RFID tag either generates the return RF response signal originally, or reflects back a portion of the interrogating RF signal in a process known as backscatter. The return RF response signal may further encode data stored internally in the tag. The return signal is demodulated and decoded into data by each reader, which thereby identifies, counts, or otherwise interacts with the associated item. The decoded data, also known as a payload, can denote a serial number, a price, a date, a destination, other attribute(s), or any combination of attributes, and so on.

The RFID system is often used in an inventory monitoring application. For example, in order to take inventory of RFID-tagged items in a retail store, it is known to position at least one RFID reader overhead in a controlled area, and then, to allow each reader to automatically read whatever tagged items are in the coverage range of each reader. For superior RF coverage, it is known to provide each reader with at least one overhead array of antenna elements that are arranged about a central vertical axis, also known as a plumb line, and that transmit the RF interrogating signal as a primary transmit beam that is electronically steered both in azimuth and in elevation, and that receive the return RF response signal via a primary receive beam from the tags.

As satisfactory as such known RFID systems utilizing antenna arrays have been in monitoring inventory, they can also be used for locationing applications, i.e., for estimating and determining the true bearing, i.e., the angular direction both in azimuth and elevation, of any particular tag, relative to a particular reader. However, there is a practical limit on the number of antenna elements that can be used in each array. This antenna element limit causes each primary transmit beam and each corresponding primary receive beam to have a relatively broad beam width. The primary transmit beam is typically steered until the reader reads the tag with the highest or peak receive signal strength (RSS) of the primary receive beam at a primary steering angle. However, estimating the bearing, i.e., the angular direction both in azimuth and elevation, of any particular tag based on the peak RSS of the primary receive beam is imprecise due to the aforementioned relatively broad beam width. Bearing errors on the order of 5 to 10 degrees have been reported and are not readily tolerable in locationing applications.

To improve the accuracy of estimating the location of a particular tag, it is known to generate multiple secondary receive beams pointing in different directions to independently measure the peak RSS for a particular tag. The primary and the secondary receive beams are jointly moved together, as a unit, in a search pattern or path in the controlled area. The controlled area may be divided into sectors or zones, in which the joint unit movement of the primary and the secondary receive beams is performed in each sector. These secondary receive beams are processed to generate azimuth and elevation error signals as azimuth and elevation corrections to the primary steering angle of the primary receive beam, thereby reducing the bearing error.

Yet, as advantageous as the known RFID system has been in accurately locating the true bearings of tags generally located in the controlled area, experience has shown that there are times when real-world conditions may sometimes interfere with the generation and processing of the azimuth and elevation error signals. For example, the controlled area may contain shelving, fixtures, equipment, vehicles, and the like, not to mention the floor, the ceiling and the room walls, each or all of which can reflect and scatter the secondary receive beams incident thereon, thereby compromising the generation and processing of their corresponding azimuth and elevation error signals. As a result, the known RFID system cannot always accurately estimate the true bearing of a tag with a high degree of resolution in such a real-world, multi-path reflection environment.

Accordingly, there is a need to accurately estimate the true bearings of RFID tags located anywhere in a controlled area, with a high degree of resolution, especially in such a real-world, multi-path reflection environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present disclosure relates to a radio frequency (RF) identification (RFID) tag reading system for estimating true bearings of RFID tags associated with items in a controlled area. The controlled area may be a retail store, a warehouse, or any other confined or open area in which RFID-tagged items are to be monitored or located. The system includes an RFID reader having a plurality of antenna elements, e.g., a beamforming array, preferably mounted overhead and arranged about a vertical axis or plumb line; a plurality of RF transceivers; and a controller or programmed microprocessor operatively connected to the transceivers, and operative for controlling the transceivers.

The controller executes a tag processing module operative for steering a primary transmit beam in the controlled area by transmitting a primary transmit signal via the plurality of the antenna elements to each tag, and for steering a primary receive beam in the controlled area at a primary steering angle along a boresight axis by receiving a primary receive signal via the plurality of the antenna elements from each tag. The controller also executes a bearing processing module operative for steering at least one secondary receive beam, and preferably a plurality of secondary receive beams, in the controlled area. Each secondary receive beam is directed at a secondary steering angle that is offset from the primary steering angle by receiving a secondary receive signal via the plurality of the antenna elements from each tag. The bearing processing module rotates each secondary receive beam in a cycle around the boresight axis. Each rotated secondary receive beam is directed at another secondary steering angle that is offset from the primary steering angle by receiving another secondary receive signal via the plurality of the antenna elements from each tag. The controller processes the secondary receive signals received in the cycle to estimate a true bearing for each tag in the controlled area. Advantageously, the cycle is divided into a plurality of predetermined angular positions, and all the secondary receive signals received in the cycle are processed at each predetermined angular position.

Thus, the rotation of each secondary beam results in a multitude of secondary receive signals being generated and received in the cycle. The multitude of secondary receive signals can be statistically analyzed by the controller to estimate the true bearing for each tag with high resolution. Having a multitude of secondary receive signals to be analyzed, rather than just several secondary receive signals, enables the system to compensate for any multi-path beam reflections in the controlled area.

A method, in accordance with another aspect of this disclosure, relates to a radio frequency (RF) identification (RFID) tag reading method of estimating true bearings of RFID tags associated with items in a controlled area. The method is performed by mounting an RFID reader in the controlled area; operatively connecting a plurality of antenna elements to the RFID reader; operatively connecting a plurality of RF transceivers to a controller; controlling the transceivers by having the controller execute a tag processing module operative for steering a primary transmit beam in the controlled area by transmitting a primary transmit signal via the plurality of the antenna elements to each tag, and for steering a primary receive beam in the controlled area at a primary steering angle along a boresight axis by receiving a primary receive signal via the plurality of the antenna elements from each tag; controlling the transceivers by having the controller execute a bearing processing module operative for steering a plurality of secondary receive beams in the controlled area at respective secondary steering angles that are offset from the primary steering angle by receiving a plurality of secondary receive signals via the plurality of the antenna elements from each tag; controlling the transceivers by having the controller execute the bearing processing module to rotate the plurality of secondary receive beams in a cycle around the boresight axis to other respective secondary steering angles that are offset from the primary steering angle by receiving another plurality of secondary receive signals via the plurality of the antenna elements from each tag; and processing all the secondary receive signals received in the cycle to estimate a true bearing for each tag in the controlled area.

Figure 1:
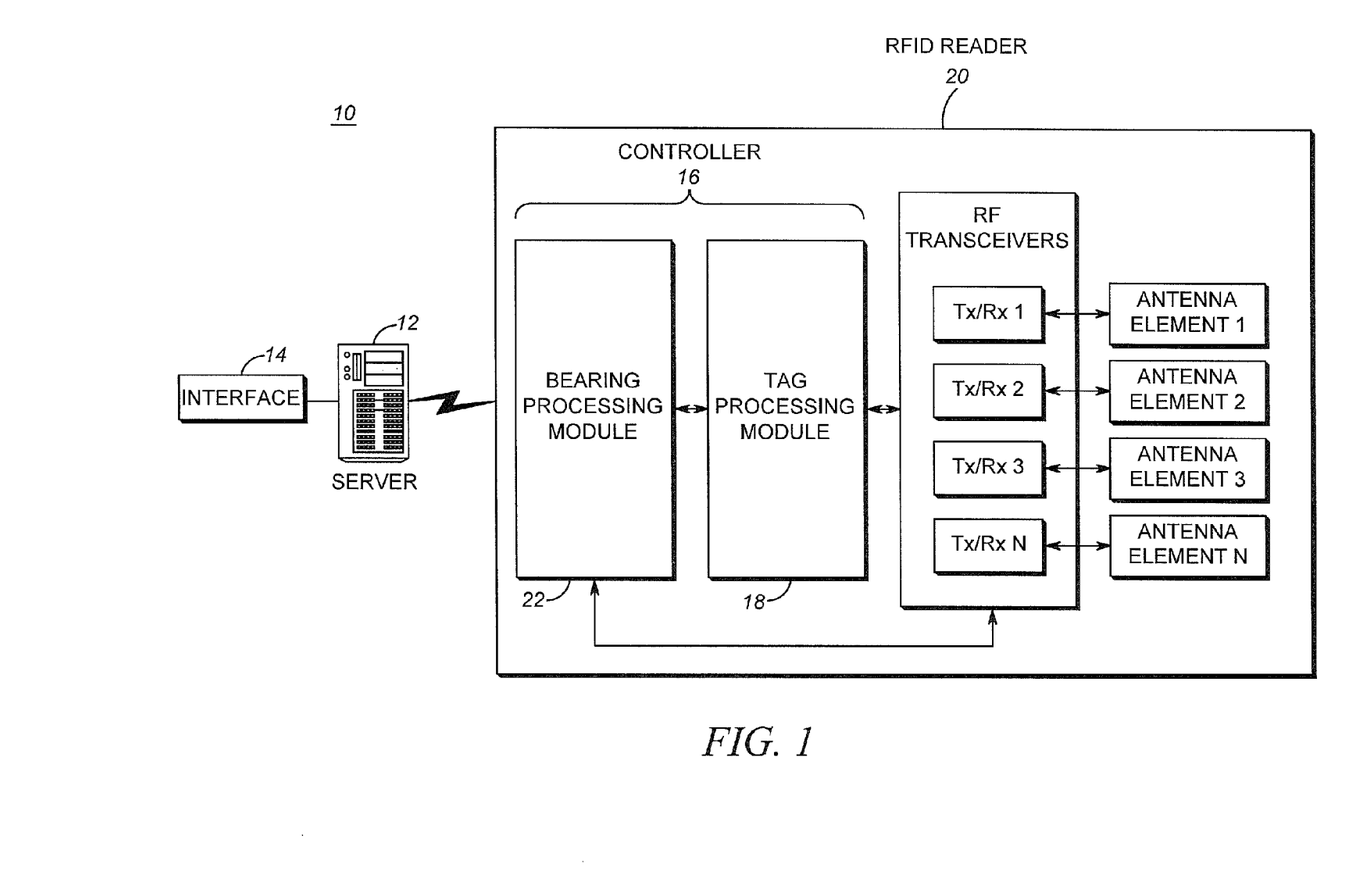
FIG. 1 is a schematic view of an exemplary radio frequency identification (RFID) tag reading system for accurately estimating true bearings of RFID tags associated with items in a controlled area in accordance with the present disclosure.

Turning now to the drawings, FIG. 1 depicts a simplified radio frequency (RF) identification (RFID) tag reading system 10 for estimating true bearings of RFID tags associated with items to be tracked or monitored or located. The system 10 has an RFID reader 20 connected to a server or host 12 and a user interface 14. The RFID reader 20 has an array or plurality of antenna elements 1, 2, 3 . . . , N, preferably a beamforming array, or a phased array. The RFID reader 20 also has a plurality of RF transceivers Tx/Rx 1, Tx/Rx 2, Tx/Rx 3, . . . , Tx/Rx N, one transceiver for, and connected to, each antenna element. The number N is arbitrary and depends on the particular application. By way of non-limiting example, sixteen antenna elements and sixteen transceivers, as described below in connection with FIGS. 6 and 7, may be employed. As explained below, the antenna elements work in groups, typically four at a time. Although FIG. 1 depicts one transceiver for each antenna element, this need not be the case. The number of transceivers may be different from the number of antenna elements. For example, a particular transceiver may be shared with two or more antenna elements.

A controller or programmed microprocessor 16 is operatively connected to the transceivers to control their operation in one or more scans or modes of operation, as described below. The controller 16 executes a software-based, tag processing module 18 during an initial coarse scan and a subsequent fine scan, and also executes a software-based, bearing processing module 22 during the fine scan. The modules 18 and 22 need not be software-based, but either or both of them could be hardware-based, or could be implemented in both software and hardware. The coarse and fine scans need not be separate distinct scans, but can be successively performed in a single scan. Although the bearing processing module 22 is depicted in FIG. 1 as being implemented in the RFID reader 20, it will be understood that the bearing processing module 22, either in whole or in part, can also be implemented in the server 12.

Figure 2:
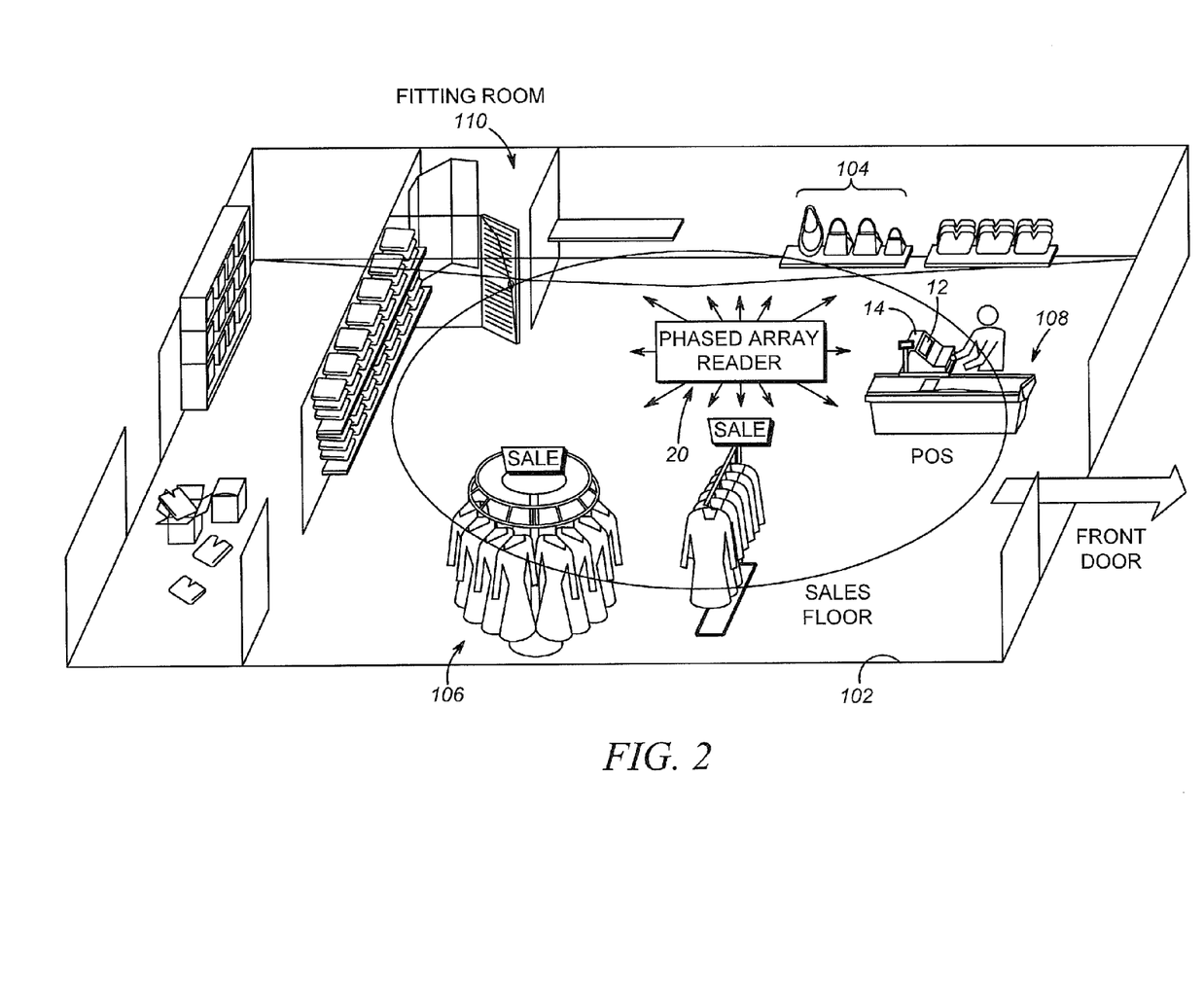
FIG. 2 is a perspective, schematic view of the system of FIG. 1 with an RFID reader and its array of antenna elements installed overhead in an exemplary controlled area, especially for locationing RFID-tagged items located underneath the overhead RFID reader and antenna array.

FIG. 2 depicts an exemplary RFID reader 20 deployed in a controlled area 102 of a retail sales floor having a point-of-sale (POS) station 108 at which the server 12 and the interface 14 may be provided, a fitting room 110, and a plurality of RFID-tagged items, e.g., clothes 106, handbags 104, etc., arranged on shelves, hangers, racks, on the floor, etc. in the controlled area 102. It will be understood that, in some applications, the server 12 is preferably located in a backroom, well away from the sales floor. Each RFID-tagged item 104, 106 is preferably associated with a passive RFID tag, e.g., not battery-operated, for cost reduction reasons, although other types of RFID tags may be employed. It will be further understood that, in some applications, for example, in a warehouse, each RFID tag is associated with a pallet or container for multiple items. To simplify the drawing, only one reader 20 has been illustrated, and the reader 20 has been illustrated as being preferably located overhead on the ceiling in the controlled area 102. It will be still further understood that more than one reader 20 could be deployed in the controlled area 102, and not necessarily deployed on the ceiling. Each reader 20 may be powered from an electrical outlet, powered over the Ethernet (POE), or can be battery powered.

The server 12 comprises one or more computers and is in wired, wireless, direct, or networked communication with the interface 14 and with the reader 20. The interface 14 provides a human/machine interface, e.g., a graphical user interface (GUI), that presents information in pictorial and/or textual form (e.g., representations of bearings of the RFID-tagged items 104, 106) to a human user, and to initiate and/or alter the execution of various processes that may be performed by the server 12 and/or by the controller 16. The server 12 and the interface 14 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 14 can be in a smartphone, or tablet, etc., while the server 12 may be a computer, either located at a controlled area 102 (see FIG. 2) containing the RFID-tagged items 104, 106, or remotely at some other location, or can be hosted in a cloud server. The server 12 advantageously includes a wireless RF transceiver that communicates with the reader 20. For example, Wi-Fi and Bluetooth® are open wireless standards for exchanging data between electronic devices.

Figure 3A:
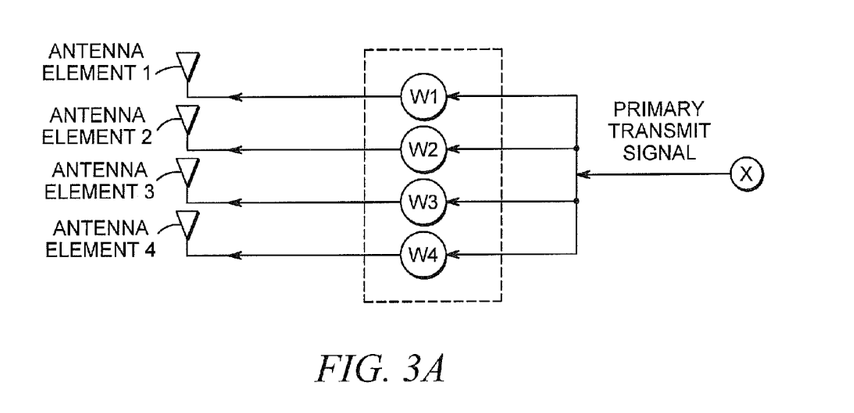
FIG. 3A is a schematic diagram depicting components of the overall system of FIG. 1 during transmission of the primary transmit beam.
Figure 3B:
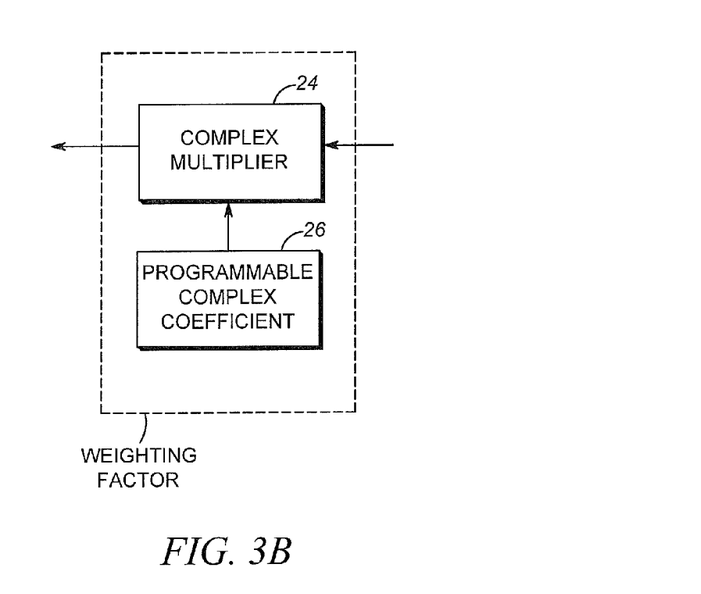
FIG. 3B is a block diagram depicting a detail of a weighting factor component for use in beam steering in the system.

During execution of the aforementioned initial or coarse scan, the controller 16 executes the tag processing module 18 by which the transceivers are commanded to act as a primary transmit beam steering unit operative for steering a primary transmit beam over the entire controlled area 102, or over a specific sector, zone, or region of the controlled area 102, by transmitting a primary transmit signal (X) via the antenna elements to each tag. As shown in FIG. 3A, the primary transmit signal (X) is conducted along different channels (in this example, four) to a plurality of the antenna elements 1, 2, 3 and 4. Steering is accomplished by introducing a complex weighting factor W1, W2, W3 and W4 on each channel, thereby altering the respective magnitudes and phases of the signal on each channel. As shown in FIG. 3B, each weighting factor can be generated by a complex multiplier 24 and a programmable device 26 that sets a complex coefficient for the complex multiplier 24 to effect baseband steering of the primary transmit beam. Baseband steering of the primary transmit beam by setting a complex coefficient for each complex multiplier 24 is known in the art, and details thereof can be obtained, for example, by reference to U.S. Pat. No. 8,587,495 and/or to "*A Primer on Digital Beamforming*", by Toby Haynes, in Spectrum Signal Processing, Mar. 26, 1998, the entire contents of said patent and said primer being incorporated herein by reference thereto.

Figure 4:
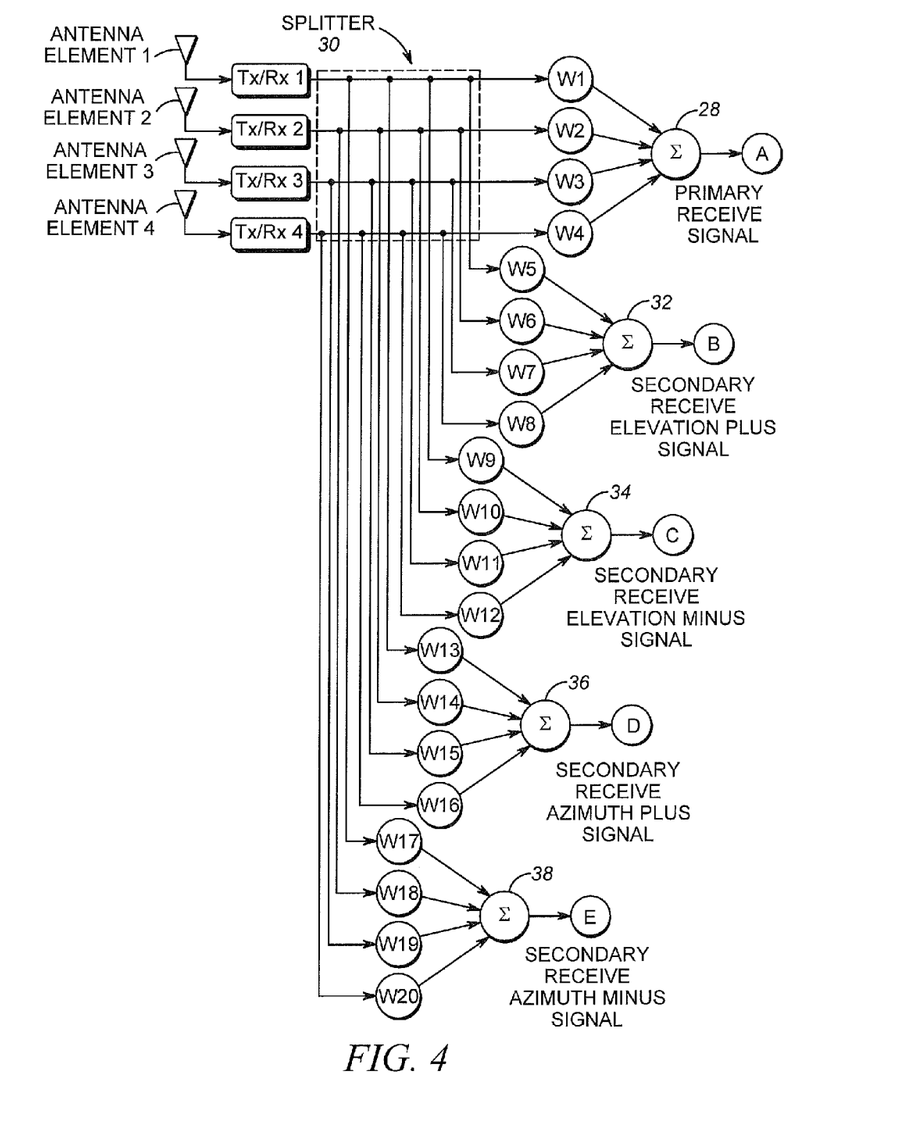
FIG. 4 is a schematic diagram depicting components of the overall system of FIG. 1 during reception of the primary receive beam, as well as of additional secondary receive beams.

During the coarse scan, the controller 16 also executes the tag processing module 18 by which the transceivers are commanded to act as a primary receive beam steering unit operative for steering a primary receive beam 120 (FIG. 8) along a boresight axis 130 (FIG. 8) at a primary steering angle by receiving a primary receive signal (A) via the antenna elements from each tag. As shown in FIG. 4, the antenna elements 1, 2, 3 and 4 receive return signals from each interrogated tag along different channels (in this example, four), and then a complex weighting factor W1, W2, W3 and W4 is introduced on each channel before all the weighted return signals are summed in an adder 28 in order to generate the primary receive signal (A). Each weighting factor is generated by the circuit of FIG. 3B. Steering of the primary receive beam 120 is effected by the weighting factors W1, W2, W3 and W4. As illustrated, the weighting factors (FIG. 4) used in steering the primary receive beam 120 is, in a preferred embodiment, the same as the weighting factors (FIG. 3A) used in steering the primary transmit beam. As a result, the steering angle for both the primary transmit beam and the primary receive beam 120 is the same, or nearly so, i.e., they have a common boresight axis 130 or general bearing, in which event, both the primary transmit beam and the primary receive beam 120 can each be individually referred to as a reference beam. However, it will be understood that the weighting factors used in steering the primary receive beam 120 may be different from the weighting factors used in steering the primary transmit beam, in which case, the steering angle for the primary transmit beam is different from the steering angle for the primary receive beam 120.

As described above, the practical limit on the number N of antenna elements that can be used in the array causes the primary transmit beam and the corresponding primary receive beam 120 to each have a relatively broad beam width, thereby rendering it difficult in practice to very accurately determine or estimate the true bearing, i.e., the angular direction both in azimuth and elevation, of a particular tag, relative to the reader. Bearing errors on the order of 5 to 10 degrees have been reported and are not tolerable in many applications. One aspect of this disclosure is directed to reducing such errors, preferably to less than one degree, especially under real-world, multi-path reflection, conditions.

As further shown in FIG. 4, the return signals from each interrogated tag from the antenna elements 1, 2, 3 and 4 are conducted through respective RF transceivers Tx/Rx 1, Tx/Rx 2, Tx/Rx 3 and Tx/Rx 4, to a splitter 30, and then routed to four sub-circuits to simultaneously generate four different secondary receive signals corresponding to four different secondary receive beams 122, 124, 126, and 128 (FIG. 8) that are offset from the reference beam 120, as described below. Thus, the return signals are conducted from the splitter 30 to weighting factors W5, W6, W7 and W8 before being summed in an adder 32 to generate a secondary receive plus elevation signal (B), corresponding to a synthesized receive beam 122 featuring a larger peak elevation angle than the reference beam 120; to weighting factors W9, W10, W11 and W12 before being summed in an adder 34 to generate a secondary receive minus elevation signal (C), corresponding to a synthesized receive beam 124 featuring a smaller peak elevation angle than the reference beam 120; to weighting factors W13, W14, W15 and W16 before being summed in an adder 36 to generate a secondary receive plus azimuth signal (D), corresponding to a synthesized receive beam 126 featuring a larger peak azimuth angle than the reference beam 120; and to weighting factors W17, W18, W19 and W20 before being summed in an adder 38 to generate a secondary receive minus azimuth signal (E), corresponding to a synthesized receive beam 128 featuring a smaller peak azimuth angle than the reference beam 120. Put another way, the return signal from antenna element 1 is conducted through transceiver Tx/Rx 1 to weighting factors W1, W5, W9, W13 and W17; the return signal from antenna element 2 is conducted through transceiver Tx/Rx 2 to weighting factors W2, W6, W10, W14 and W18; the return signal from antenna element 3 is conducted through transceiver Tx/Rx 3 to weighting factors W3, W7, W11, W15 and W19; and the return signal from antenna element 4 is conducted through transceiver Tx/Rx 4 to weighting factors W4, W8, W12, W16 and W20.

Each weighting factor W5 through W20 is generated by a circuit identical to that depicted in FIG. 3B. The weighting factors W5, W6, W7 and W8 are selected such that the secondary receive beam 122 formed by the plus elevation signal (B) has a steering angle that is located a few degrees, e.g., ten degrees, in one direction away from the elevation of the primary steering angle of the reference beam 120, and the weighting factors W9, W10, W11 and W12 are selected such that the secondary receive beam 124 formed by the minus elevation signal (C) has a steering angle that is located a few degrees, e.g., ten degrees, in an opposite direction away from the elevation of the primary steering angle of the reference beam 120. The weighting factors W13, W14, W15 and W16 are selected such that the secondary receive beam 126 formed by the plus azimuth signal (D) has a steering angle that is located a few degrees, e.g., ten degrees, in one direction away from the azimuth of the primary steering angle of the reference beam 120. The weighting factors W17, W18, W19 and W20 are selected such that the secondary receive beam 128 formed by the minus azimuth signal (E) has a steering angle that is located a few degrees, e.g., ten degrees, in an opposite direction away from the azimuth of the primary steering angle of the reference beam 120.

Thus, four secondary receive beams 122, 124, 126, and 128 (FIG. 8) have been formed. The secondary receive beams may be formed simultaneously, or sequentially provided that they are all formed within a time frame during which the RFID tag being located is not expected to be moved to any appreciable extent. The secondary receive beams 122, 124 formed by the plus and minus elevation signals (B) and (C) bracket the elevation of the reference beam 120. The secondary receive beams 126, 128 formed by the plus and minus azimuth signals (D) and (E) bracket the azimuth of the reference beam 120. The terms "plus" and "minus", as used herein to describe the signals (B), (C), (D), and (E), are intended to describe the opposite directions in which the secondary receive beams are steered.

Figure 5:
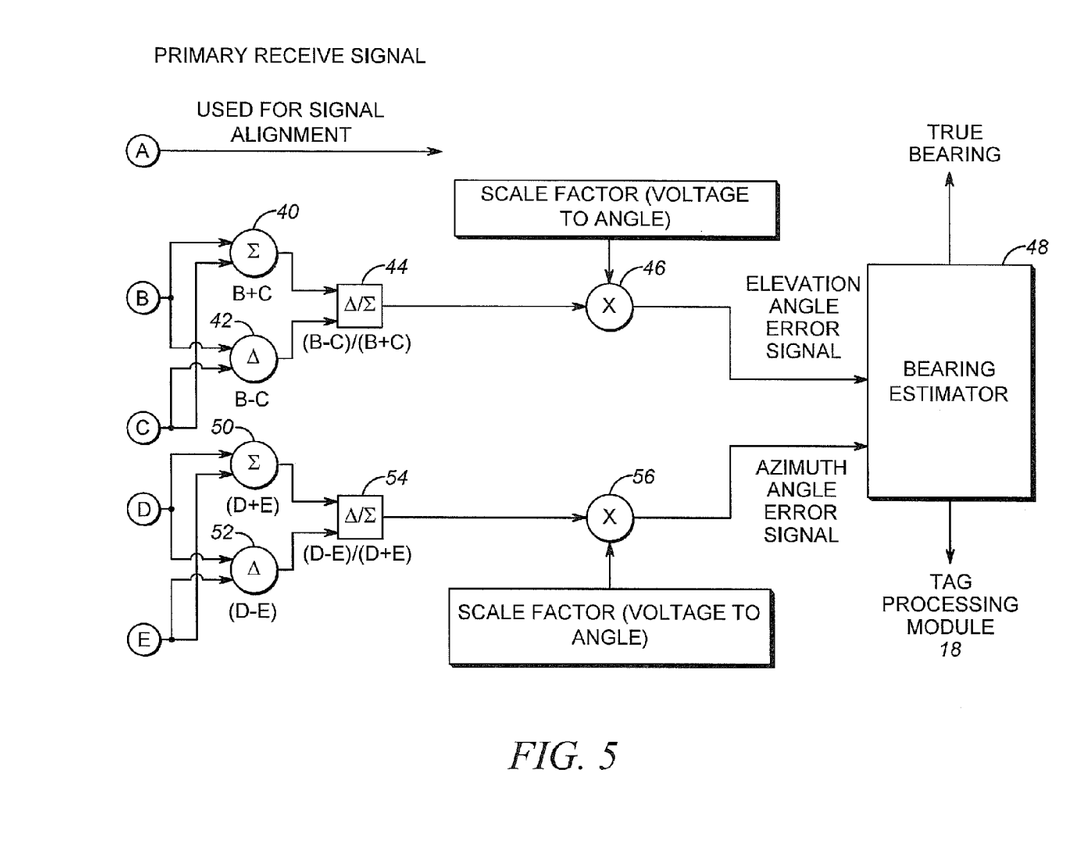
FIG. 5 is a block diagram depicting signal processing of the primary and the secondary receive beams depicted in FIG. 4 to obtain a true bearing for each RFID-tagged item.

Turning now to FIG. 5, the elevation signals (B) and (C) and the azimuth signals (D) and (E) are separately processed to obtain elevation and azimuth bearing correction factors used to determine the true bearing of each interrogated tag. Thus, the elevation signals (B) and (C) are summed in an adder 40, and are differenced from each other in a subtractor 42. A divider 44 divides the difference (B−C) from the subtractor 42 by the sum (B+C) from the adder 40, and the output of the divider 44, which is a voltage, is converted to an angle by a converter 46, thereby yielding an elevation angle error signal that is input to a bearing estimator 48. Also, the azimuth signals (D) and (E) are summed in an adder 50, and are differenced from each other in a subtractor 52. A divider 54 divides the difference (D−E) from the subtractor 52 by the sum (D+E) from the adder 50, and the output of the divider 54, which is a voltage, is converted to an angle by a converter 56, thereby yielding an azimuth angle error signal that is input to the bearing estimator 48. The bearing estimator 48 compares the two elevation and azimuth angle error signals against the elevation and azimuth of the primary receive signal (A), and outputs a true bearing for each interrogated tag. This output can be stored, or sent to the server 12, or it can be sent to the tag processing module 18 for beam steering.

As described above, four of the antenna elements are employed to steer the four secondary receive beams 122, 124, 126, and 128 at opposite sides of the reference beam. In another embodiment, sixteen RF transceivers may be used to connect to sixteen antenna elements, and the beams corresponding to signals (A), (B), (C), (D), and (E) may be formed using a circuit that employs sixteen complex multipliers. In yet another embodiment, sixteen antenna elements are employed in the array, and a switch is used to switch the same four RF transceivers to four of the sixteen antenna elements. At any given time, four out of the sixteen antenna elements are active, while the remaining twelve antenna elements are inactive. These four antenna elements are effectively working in one volume or sector of space in the controlled area 102. The remaining antenna elements in the array are preferably working successively or sequentially in the same or in different volumes or sectors of space in the controlled area. The antenna elements work in groups, typically four at a time, and advantageously, there may be overlap in volume or sector coverage between antenna elements in the different groups. It will be understood that this disclosure is not intended to be limited to a group of four antenna elements, because a different number or group of antenna elements, and a different number or group of secondary receive beams, could be employed.

As described above, four separate subcircuits are employed, as shown in FIG. 4, to simultaneously generate the two elevation signals (B) and (C) and the two azimuth signals (D) and (E), and to simultaneously steer their secondary receive beams. In a time-multiplexed variation, one or more such subcircuits can be shared. For example, only one such subcircuit could be employed, and different sets of weighting factors could be sequentially applied at the one such subcircuit to sequentially generate the signals (B), (C), (D) and (E), and to sequentially steer their secondary receive beams.

Figure 6:
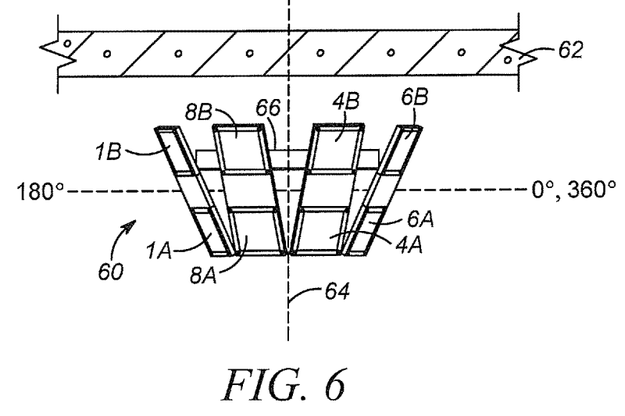
FIG. 6 is a side view of an antenna array of the overhead RFID reader of FIG. 2.
Figure 7:
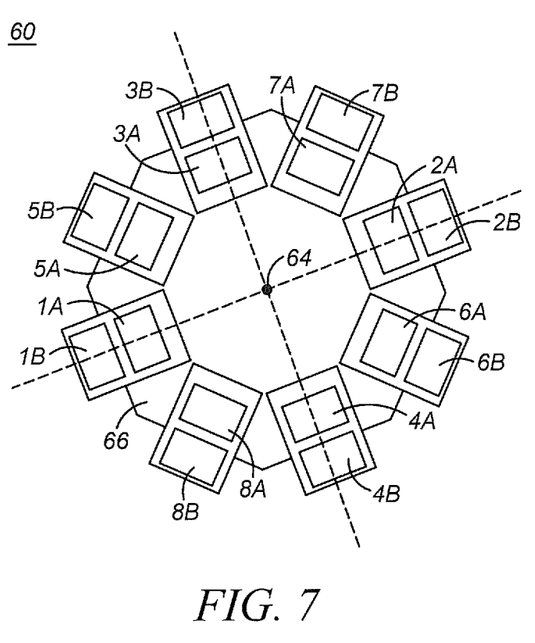
FIG. 7 is a top plan view looking down on the antenna array of FIG. 6.

FIGS. 6-7 depict an exemplary embodiment of an overhead antenna array 60 for the reader 20. The system or the reader 20 may have a plurality of such arrays 60. The overhead array 60 is mounted on a planar ceiling 62 and is advantageously comprised of sixteen antenna elements arranged, preferably equiangularly, circumferentially around and about a central vertical axis 64, or plumb line, which is generally perpendicular to the plane of the ceiling 62. The antenna elements are mounted in pairs on generally planar supports or antenna planes that are tilted relative to the vertical axis 64 and assume a generally frustoconical shape. Antenna elements 1A, 2A, 3A, 4A, 5A, 6A, 7A and 8A are arranged in a lower annulus at a lower elevation as compared to an upper annulus in which the antenna elements 1B, 2B, 3B, 4B, 5B, 6B, 7B and 8B are arranged at a higher elevation. As previously noted, the antenna elements work in groups, typically four at a time. Each antenna element is advantageously configured as a patch antenna. The antenna elements are supported by an octagonal main support 66, which also advantageously supports other components of the reader 20.

Figure 8:
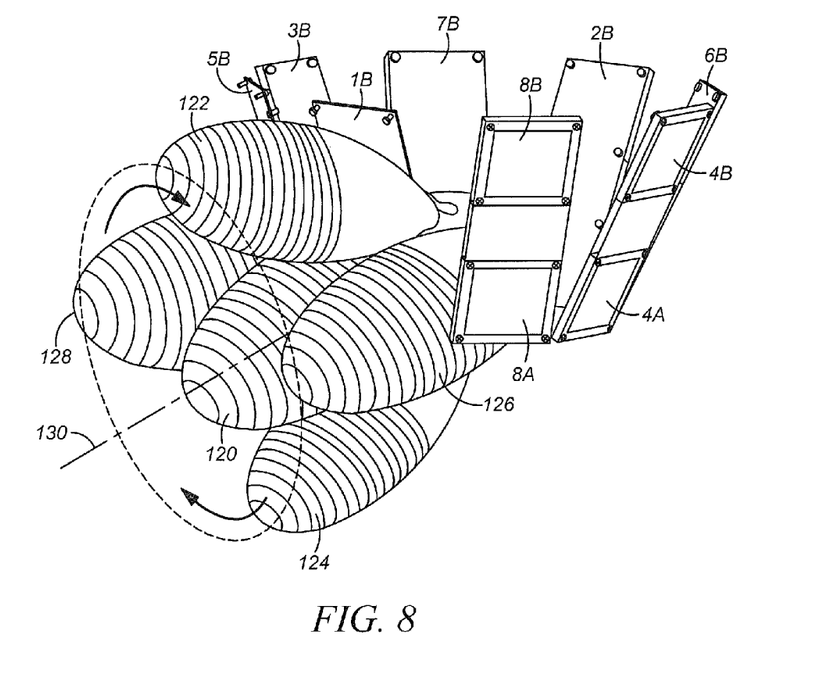
FIG. 8 is an enlarged, perspective view of the primary and secondary receive beams radiated by the antenna array of FIG. 6, as well as the rotation of the secondary receive beams in accordance with the present disclosure.

As shown in FIG. 8, the overhead array 60 radiates the primary receive beam 120 that extends along the boresight axis 130, as well as the four secondary receive beams 122, 124, 126, and 128 at opposite sides of, and bracketing, the boresight axis 130. Thus, at best, there are only four receive signals (B), (C), (D) and (E) that can be employed to estimate the true bearing of a tag. As explained above, real-world conditions may sometimes interfere with the generation and processing of the receive signals (B), (C), (D) and (E). For example, the controlled area 102 may contain shelving, fixtures, equipment, vehicles, and the like, not to mention the floor, the ceiling and the room walls, each or all of which can reflect and scatter one or more of the secondary receive beams 122, 124, 126, and 128 incident thereon, thereby compromising the generation of the receive signals (B), (C), (D) and (E) and the processing of their corresponding azimuth and elevation error signals. As a result, the RFID system described so far cannot always accurately estimate the true bearing of a tag with a high degree of resolution in such a real-world, multi-path reflection environment.

Figure 9:
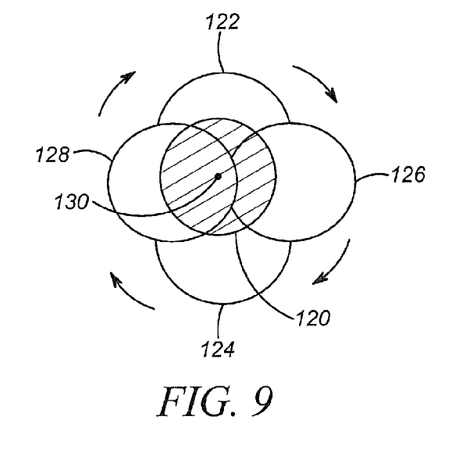
FIG. 9 is an end view of FIG. 8 on a reduced scale, again depicting the rotation of the secondary receive beams in accordance with the present disclosure.

In accordance with this invention, it is desired to generate more than four receive signals, and preferably, a multitude of such receive signals, especially in an efficient manner, such that a failure to generate and process any one or more of such receive signals due to multi-path reflection and like environmental conditions, will not compromise the overall estimation of the true tag bearing. To that end, in accordance with one embodiment, the controller 16 is further operative for executing the bearing processing module 22 to rotate a plurality of the secondary receive beams 122, 124, 126, and 128 in a cycle or orbit around the boresight axis 130, as depicted by the circumferential arrows in FIGS. 8-9. The term "cycle", as used herein and in the claims, is not intended to be limited to a complete 360° revolution around the boresight axis 130, because the term "cycle" is intended to also cover a part-revolution or arc of limited angular extent. In addition, the clockwise direction depicted by the circumferential arrows in FIGS. 8-9 is merely exemplary, because the direction of rotation can also be counterclockwise. Nor is the direction of rotation to be solely unidirectional during the cycle; for example, a cycle can consist of a first clockwise rotation along a first arc, followed by a second counterclockwise rotation along a second arc, and the first and second arcs may have the same or different angular extents. The term "cycle" is also intended to cover arcs that are angularly spaced apart from each other, and thus, the term "cycle" is to be interpreted so broadly as comprising one or more arcuate path portions.

The cycle may advantageously be divided by the controller 16 into a plurality of predetermined angular positions. If the cycle describes a circular orbit, then the cycle may advantageously be divided into ten angular positions, each spaced apart by 36 degrees. Of course, more or fewer angular positions may be configured, and the spacings between adjacent positions need not be equal. In each angular position, a plurality of secondary receive signals (B), (C), (D) and (E) are received from the secondary receive beams 122, 124, 126, and 128. Thus, in each cycle, there will be a multitude (in this case, forty) of receive signals. The controller 16 processes this multitude of secondary receive signals received in the cycle, and a true bearing for each tag in the controlled area is estimated, with less dependence than heretofore on any one or more receive signals not, or incompletely, being generated. The controller 16 may also perform a statistical analysis on this multitude of secondary receive signals, thereby further enhancing the estimation.

In another embodiment, rather than rotating four secondary receive beams 122, 124, 126, and 128, as just described, only a single pair need be rotated. For example, a single pair of beams can serve as the elevation offset beams 122, 124 to generate signals (B) and (C) when arranged vertically (FIG. 9), and subsequently, as the azimuth offset beams 126, 128 to generate signals (D) and (E) when arranged horizontally (FIG. 9). This reduces the processing burden on the controller 16.

In still another embodiment, rather than rotating four or two of the secondary receive beams 122, 124, 126, and 128, as just described, only a single beam need be rotated. For example, assuming a conventional watch face in FIG. 9, a single beam can serve as the elevation offset beam 122 to generate signal (B) in the 12 o'clock position of FIG. 9, and subsequently, as the azimuth offset beam 126 to generate signal (D) in the 3 o'clock position of FIG. 9, and subsequently, as the elevation offset beam 124 to generate signal (C) in the 6 o'clock position of FIG. 9, and subsequently, as the azimuth offset beam 128 to generate signal (E) in the 9 o'clock position of FIG. 9. This also reduces the processing burden on the controller 16, but at the expense of system responsiveness.

Figure 10:
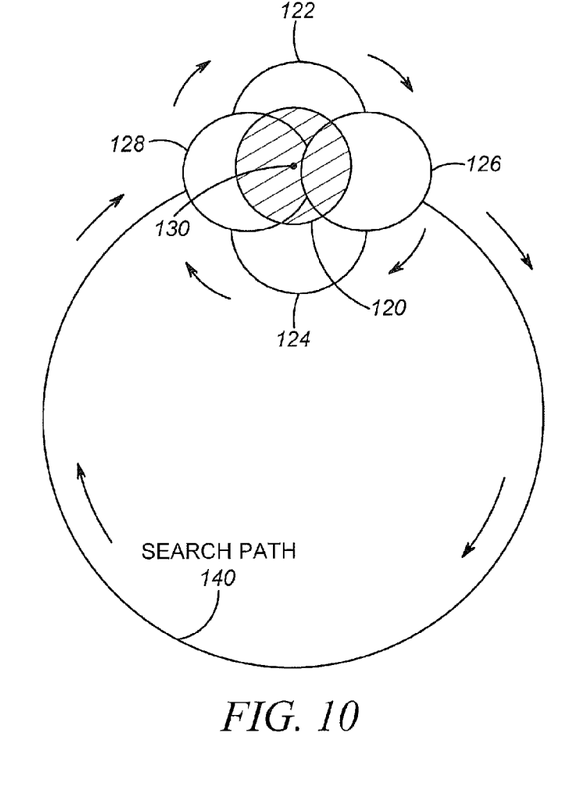
FIG. 10 is a view analogous to FIG. 9, depicting not only the rotation of the secondary receive beams, but also the movement of all the primary and secondary receive beams along a search path in the controlled area, or a sector thereof.

As shown in FIG. 10, the rotation of the secondary receive beams 122, 124, 126, and 128 is performed while the primary beam 130 and the secondary receive beams 122, 124, 126, and 128 are being jointly moved together, as a unit, in a search pattern 140 or path in the controlled area 102. The search pattern 140 need not be circular as shown, because helical, spiral, raster and like search patterns could also be performed. The controlled area 102 may be divided into sectors or zones, in which the joint unit movement of the primary and the secondary receive beams is performed in each sector. Thus, there are two components of motion. The first motion component involves jointly moving the primary beam 130 and the secondary receive beams 122, 124, 126, and 128 as a unit, in a manner akin to a searchlight. In this first motion component, the primary beam 130 and the secondary receive beams 122, 124, 126, and 128 do not move relative to each other. However, the second motion component involves rotating the secondary receive beams 122, 124, 126, and 128 around the boresight 130.

As previously described, steering of each beam is performed by the programmable device 26 setting a complex coefficient for the complex multiplier 24 to introduce a weighting factor (W1-W20) on each channel. The rotation of the secondary receive beams is performed by dynamically changing the weighting factor on each channel. In one approach, the weighting factors for each predetermined angular position in the cycle may be stored in a database, and retrieved as needed. In another approach, to conserve memory, the weighting factors for only a few predetermined angular positions in the cycle may be stored in the database, in which case, the weighting factors for intermediate angular positions in the cycle are not stored, but are interpolated from the stored positions. In still another approach, the weighting factors can be dynamically calculated from an algorithm, which is the most efficient method and requires minimal memory usage.

Figure 11:
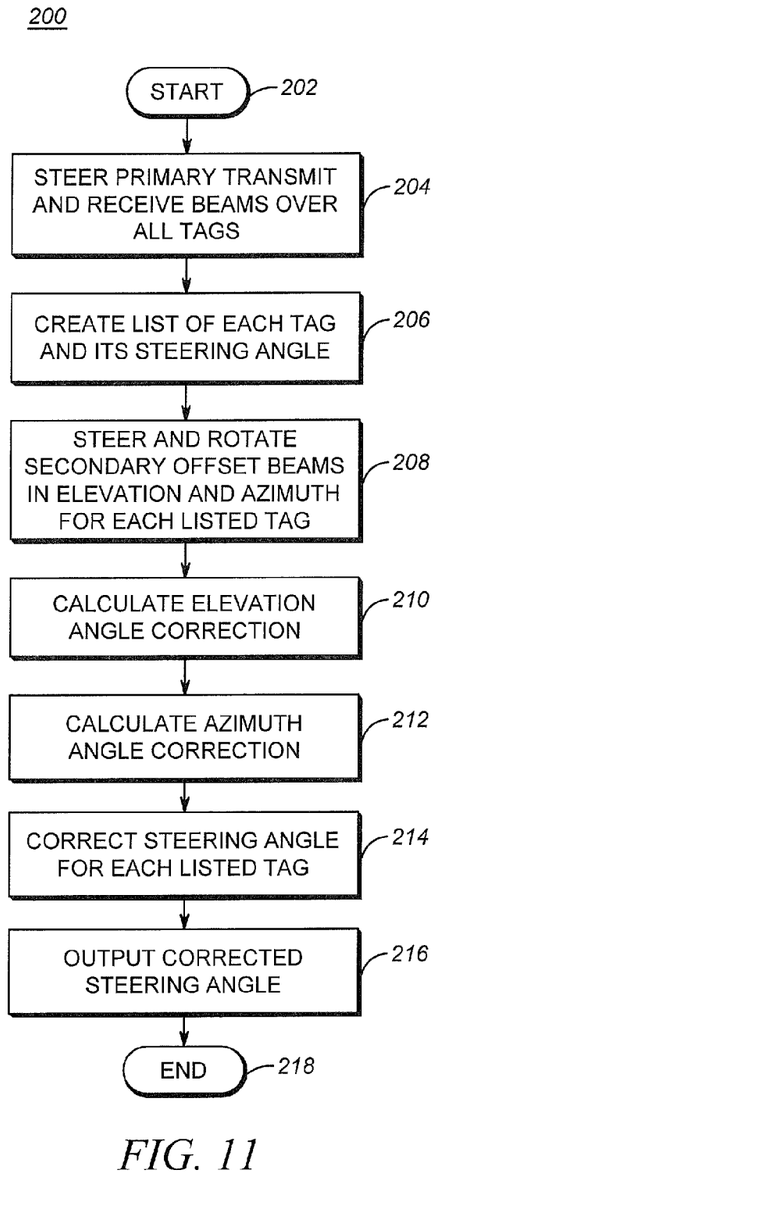
FIG. 11 is a flow chart depicting steps performed in accordance with a method of accurately estimating true bearings of RFID tags associated with items in the controlled area in accordance with the present disclosure.

As described above, and as shown in the flow chart 200 of FIG. 11, beginning at start step 202, the RFID system 10 accurately estimates the true bearings of RFID tags associated with the items 104, 106 in the controlled area 102, by steering the primary transmit beam and the primary receive beam 120 over all the tags (step 204), and by creating a list of all the tags that were read, together with the primary steering angle of the primary receive beam 120 having the highest peak receive signal strength intensity (RSSI) level for each tag that was read (step 206). Then, for each such listed tag, the system steers a set of the secondary receive beams at steering angles that are offset in elevation and azimuth relative to the elevation and azimuth of the primary steering angle of the primary receive beam 120, and rotates the set of the secondary receive beams in a cycle about the boresight axis 130 of the primary receive beam 120 (step 208). The listed tags may be re-read, once or multiple times, for each offset beam, and for each angular position in the cycle. Then, for each listed tag, the system calculates an elevation angle correction for the elevation of the primary steering angle (step 210) by dividing a difference and a sum of receive elevation offset signals for the elevation offset beams. Similarly, for each listed tag, the system calculates an azimuth angle correction to the azimuth of the primary steering angle (step 212) by dividing a difference and a sum of receive azimuth offset signals for the azimuth offset beams. Next, the steering angle is corrected for each listed tag (step 214), and the corrected steering angle, i.e., the true bearing for each listed tag is output (step 216). The method ends at step 218. In one embodiment, all the tags can be read, and then the reader can go back to each tag and estimate its bearing. In another embodiment, the bearing of each tag is estimated not as a subsequent activity.

By way of numerical example, in the following Table, a sample set of elevation pointing angle weighting factors w1, w2, w3 and w4 (see FIG. 4) are listed for two representative azimuth angles of 0 degrees and 90 degrees. The |wX| symbol represents the normalized weight magnitude for each weighting factor, and the <wX symbol represents the corrected weight angle in degrees for each weighting factor.

| Azimuth (deg.) | \|w1\| (mag.) | <w1 (deg.) | \|w2\| (mag.) | <w2 (deg.) | \|w3\| (mag.) | <w3 (deg.) | \|w4\| (mag.) | <w4 (deg.) |
|---|---|---|---|---|---|---|---|---|
| 0  | 0.933983 | 0 | 0.330965 | 355.4507 | 0.523427 | 91.20311 | 0.540355 | 279.285 |
| 90 | 0.560555 | 0 | 0.697511 | 188.5327 | 0.859195 | 277.9995 | 0.094134 | 281.324 |
| 0  | 0.930288 | 0 | 0.400366 | 327.0607 | 0.506948 | 74.56907 | 0.514875 | 262.3887 |
| 90 | 0.580431 | 0 | 0.721382 | 187.2877 | 0.813389 | 286.1874 | 0.17008  | 269.9846 |
| 0  | 0.916051 | 0 | 0.497147 | 290.5239 | 0.480049 | 52.28113 | 0.480699 | 240.461 |
| 90 | 0.610776 | 0 | 0.749418 | 185.8635 | 0.742687 | 296.7147 | 0.248121 | 255.7095 |
| 0  | 0.894283 | 0 | 0.568638 | 264.9239 | 0.461371 | 36.34886 | 0.46029  | 225.123 |
| 90 | 0.639672 | 0 | 0.770521 | 185.0329 | 0.680517 | 304.8375 | 0.286068 | 242.8089 |
| 0  | 0.85999  | 0 | 0.645957 | 239.1771 | 0.442633 | 20.04748 | 0.441651 | 209.3871 |
| 90 | 0.674587 | 0 | 0.791395 | 184.2738 | 0.603625 | 314.9805 | 0.319507 | 226.1801 |
| 0  | 0.798941 | 0 | 0.739171 | 206.8563 | 0.425145 | 1.050718 | 0.427074 | 190.3314 |
| 90 | 0.720276 | 0 | 0.808361 | 183.5592 | 0.492822 | 331.7947 | 0.364286 | 198.7206 |
| 0  | 0.743335 | 0 | 0.803339 | 183.1769 | 0.415643 | 348.4146 | 0.420906 | 176.8845 |

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A radio frequency (RF) identification (RFID) tag reading system for estimating true bearings of RFID tags associated with items in a controlled area, comprising:
    an RFID reader having a plurality of antenna elements, and a plurality of RF transceivers; and
    a controller operatively connected to the transceivers, and operative for controlling the transceivers by executing a tag processing module operative for steering a primary transmit beam in the controlled area by transmitting a primary transmit signal via the plurality of the antenna elements to each tag, and for steering a primary receive beam in the controlled area at a primary steering angle along a boresight axis by receiving a primary receive signal via the plurality of the antenna elements from each tag,
    the controller being further operative for controlling the transceivers by executing a bearing processing module operative for steering at least one secondary receive beam in the controlled area at one secondary steering angle that is offset from the primary steering angle by receiving at least one secondary receive signal via the plurality of the antenna elements from each tag,
    the controller being further operative for executing the bearing processing module to rotate the at least one secondary receive beam in a cycle around the boresight axis to another secondary steering angle that is offset from the primary steering angle by receiving another secondary receive signal via the plurality of the antenna elements from each tag, and
    the controller being further operative for executing the bearing processing module to process the secondary receive signals received in the cycle to estimate a true bearing for each tag in the controlled area.

2. The system of claim 1, wherein the bearing processing module is operative for steering a plurality of secondary receive beams in the controlled area at respective secondary steering angles that are offset from the primary steering angle by receiving a plurality of secondary receive signals, and for rotating the plurality of secondary receive beams in the cycle around the boresight axis to other respective secondary steering angles that are offset from the primary steering angle by receiving another plurality of secondary receive signals, and for processing all the secondary receive signals received in the cycle to determine a true bearing for each tag in the controlled area.

3. The system of claim 2, wherein the controller is operative for dividing the cycle into a plurality of predetermined angular positions, and wherein the bearing processing module is operative for processing all the secondary receive signals received in the cycle at each predetermined angular position.

4. The system of claim 3, wherein the controller is operative for statistically analyzing the secondary receive signals to estimate the true bearing for each tag.

5. The system of claim 3, wherein the bearing processing module is operative, at each predetermined angular position, for steering a first pair of the secondary receive beams at opposite sides of the boresight axis in elevation, and for processing a first pair of the secondary receive signals to obtain a pair of elevation offset signals; and wherein the bearing processing module is further operative, at each predetermined angular position, for steering a second pair of the secondary receive beams at opposite sides of the boresight axis in azimuth, and for processing a second pair of the secondary receive signals to obtain a pair of azimuth offset signals.

6. The system of claim 5, wherein the bearing processing module is operative, at each predetermined angular position, for processing the elevation offset signals by dividing their difference by their sum to obtain an elevation error signal as an elevation correction to the primary steering angle, and wherein the bearing processing module is operative, at each predetermined angular position, for processing the azimuth offset signals by dividing their difference by their sum to obtain an azimuth error signal as an azimuth correction to the primary steering angle.

7. The system of claim 2, wherein the bearing processing module is operative for jointly steering the primary and the secondary receive beams in a search path in the controlled area, while the secondary receive beams rotate about the boresight axis.

8. The system of claim 2, wherein the bearing processing module is operative for steering each secondary receive beam by receiving the secondary receive signals over a plurality of channels; and further comprising, on each channel, a complex multiplier and a programmable device for setting a complex coefficient for the complex multiplier to introduce a weighting factor on each channel to effect steering; and wherein the controller is operative for rotating the plurality of secondary receive beams by dynamically changing the weighting factor on each channel.

9. A radio frequency (RF) identification (RFID) tag reading system for estimating true bearings of RFID tags associated with items in a controlled area, comprising:
an RFID reader mounted at an overhead location in the controlled area, and having a plurality of antenna elements arranged in an array, and a plurality of RF transceivers;
a server operatively connected to the RFID reader; and
a controller located in at least one of the RFID reader and the server and operatively connected to the transceivers, the controller being operative for controlling the transceivers by executing a tag processing module operative for steering a primary transmit beam in the controlled area by transmitting a primary transmit signal via the plurality of the antenna elements to each tag, and for steering a primary receive beam in the controlled area at a primary steering angle along a boresight axis by receiving a primary receive signal via the plurality of the antenna elements from each tag,
the controller being further operative for controlling the transceivers by executing a bearing processing module operative for steering a plurality of secondary receive beams in the controlled area at respective secondary steering angles that are offset from the primary steering angle by receiving a plurality of secondary receive signals via the plurality of the antenna elements from each tag,
the controller being further operative for executing the bearing processing module to rotate the plurality of secondary receive beams in a cycle around the boresight axis to other respective secondary steering angles that are offset from the primary steering angle by receiving another plurality of secondary receive signals via the plurality of the antenna elements from each tag, and
the controller being further operative for executing the bearing processing module to process all the secondary receive signals received in the cycle to estimate a true bearing for each tag in the controlled area.

10. The system of claim 9, wherein the controller is operative for dividing the cycle into a plurality of predetermined angular positions, and wherein the bearing processing module is operative for processing the secondary receive signals received in the cycle at each predetermined angular position.

11. A radio frequency (RF) identification (RFID) tag reading method of estimating true bearings of RFID tags associated with items in a controlled area, comprising:
mounting an RFID reader in the controlled area;
operatively connecting a plurality of antenna elements to the RFID reader;
operatively connecting a plurality of RF transceivers to a controller;
controlling the transceivers by having the controller execute a tag processing module operative for steering a primary transmit beam in the controlled area by transmitting a primary transmit signal via the plurality of the antenna elements to each tag, and for steering a primary receive beam in the controlled area at a primary steering angle along a boresight axis by receiving a primary receive signal via the plurality of the antenna elements from each tag;
controlling the transceivers by having the controller execute a bearing processing module operative for steering a plurality of secondary receive beams in the controlled area at respective secondary steering angles that are offset from the primary steering angle by receiving a plurality of secondary receive signals via the plurality of the antenna elements from each tag;
controlling the transceivers by having the controller execute the bearing processing module to rotate the plurality of secondary receive beams in a cycle around the boresight axis to other respective secondary steering angles that are offset from the primary steering angle by receiving another plurality of secondary receive signals via the plurality of the antenna elements from each tag; and
processing all the secondary receive signals received in the cycle to estimate a true bearing for each tag in the controlled area.

12. The method of claim 11, and dividing the cycle into a plurality of predetermined angular positions, and wherein the processing is performed on all the secondary receive signals received in the cycle at each predetermined angular position.

13. The method of claim 12, and statistically analyzing the secondary receive signals to estimate the true bearing for each tag.

14. The method of claim 12, and, at each predetermined angular position, steering a first pair of the secondary receive beams at opposite sides of the boresight axis in elevation, and processing a first pair of the secondary receive signals to obtain a pair of elevation offset signals; and, at each predetermined angular position, steering a second pair of the secondary receive beams at opposite sides of the boresight axis in azimuth, and processing a second pair of the secondary receive signals to obtain a pair of azimuth offset signals.

15. The method of claim 14, and, at each predetermined angular position, processing the elevation offset signals by dividing their difference by their sum to obtain an elevation error signal as an elevation correction to the primary steering angle; and, at each predetermined angular position, processing the azimuth offset signals by dividing their difference by their sum to obtain an azimuth error signal as an azimuth correction to the primary steering angle.

16. The method of claim 11, and jointly steering the primary and the secondary receive beams in a search path in the controlled area, while the secondary receive beams rotate about the boresight axis.

17. The method of claim 11, and steering each secondary receive beam by receiving the secondary receive signals over a plurality of channels; and providing, on each channel, a complex multiplier and a programmable device for setting a complex coefficient for the complex multiplier to introduce a weighting factor on each channel to effect steering; and rotating the plurality of secondary receive beams is performed by dynamically changing the weighting factor on each channel.

* * * * *